United States Patent
Malik et al.

(10) Patent No.: US 12,553,404 B2
(45) Date of Patent: Feb. 17, 2026

(54) ROCKET ENGINE WITH DUAL CONTOUR NOZZLE

(71) Applicant: Innovative Rocket Technologies Inc., East Islip, NY (US)

(72) Inventors: Asad Malik, East Islip, NY (US); Jeffery Alan Muss, Sacramento, CA (US)

(73) Assignee: Innovative Rocket Technologies Inc., East Islip, NY (US)

( * ) Notice: Subject to any disclaimer, the term of this patent is extended or adjusted under 35 U.S.C. 154(b) by 0 days.

(21) Appl. No.: 19/038,327

(22) Filed: Jan. 27, 2025

(65) Prior Publication Data

US 2025/0172111 A1    May 29, 2025

Related U.S. Application Data

(60) Division of application No. 18/638,449, filed on Apr. 17, 2024, now Pat. No. 12,209,558, which is a continuation-in-part of application No. 18/046,790, filed on Oct. 14, 2022, now Pat. No. 12,025,079.

(51) Int. Cl.
| | |
|---|---|
| *F02K 9/97* | (2006.01) |
| *B64G 1/00* | (2006.01) |
| *B64G 1/62* | (2006.01) |
| *F02K 9/52* | (2006.01) |
| *F02K 9/82* | (2006.01) |

(52) U.S. Cl.
CPC ............ *F02K 9/97* (2013.01); *B64G 1/006* (2023.08); *B64G 1/62* (2013.01); *B64G 1/625* (2023.08); *F02K 9/52* (2013.01); *F02K 9/82* (2013.01)

(58) Field of Classification Search
CPC ..... F02K 9/80; F02K 9/82; F02K 9/88; F02K 9/97; B64G 1/002; B64G 1/006; B64G 1/62; B64G 1/625
See application file for complete search history.

(56) References Cited

U.S. PATENT DOCUMENTS

| | | | |
|---|---|---|---|
| 3,151,446 A | 10/1964 | Parilla | |
| 3,925,982 A | 12/1975 | Mueller | |
| 4,947,644 A | 8/1990 | Hermant | |
| 6,996,973 B2 | 2/2006 | Dujarric | |
| 8,220,249 B2 * | 7/2012 | Kimura | F02K 9/58 239/265.17 |

(Continued)

OTHER PUBLICATIONS

Davis, "Experimental and Computational Investigation of a Dual-Bell Nozzle", Jan. 5-9, 2015, AIAA SciTech Forum.

(Continued)

*Primary Examiner* — Kyle Robert Thomas
(74) *Attorney, Agent, or Firm* — GREENBERG TRAURIG, LLP

(57) ABSTRACT

A rocket engine includes a primary chamber and a double contour nozzle attached to the primary chamber. The double contour nozzle includes an inner contour nozzle, an outer contour nozzle, and a transition region between the inner contour nozzle. The inner contour nozzle includes a conical contour. The outer contour nozzle includes a bell contour and at least one propellant injection orifice. The contour break point includes a radius of curvature that is less than 0.75 and a tangency angle that is in a range of from 40 degrees to 90 degrees.

10 Claims, 5 Drawing Sheets

(56) References Cited

U.S. PATENT DOCUMENTS

| 8,763,361 | B2* | 7/2014 | Bulman | F02K 9/86 |
| | | | | 60/243 |
| 2007/0012820 | A1* | 1/2007 | Buehler | B64G 1/14 |
| | | | | 244/158.9 |
| 2011/0219742 | A1* | 9/2011 | Mungas | F02K 9/97 |
| | | | | 60/770 |
| 2020/0263636 | A1* | 8/2020 | Malik | F02K 9/56 |

OTHER PUBLICATIONS

Grisnik, "Experimental Study of Low Reynolds Number Nozzles", May 11-13, 1987, 19th International Electric Propulsion Conference, cosponsored by the AIAA, DGLR, and JSASS.

Bourne, "Radius of Curvature", Dec. 2, 2020, Interactive Mathematics.

* cited by examiner

ROCKET ENGINE WITH DUAL CONTOUR NOZZLE

CROSS-REFERENCE

This application is a divisional of commonly-owned, co-pending U.S. patent application Ser. No. 18/638,449, filed on Apr. 17, 2024, amd entitled "ROCKET ENGINE WITH DUAL CONTOUR NOZZLE," which is a continuation-in-part of commonly-owned, co-pending U.S. patent application Ser. No. 18/046,790, filed on Oct. 14, 2022 and entitled "ROCKET ENGINE WITH DUAL CONTOUR NOZZLE," the contents of which are incorporated herein by reference in their entirety

FIELD

The present disclosure relates to rocket engines with dual contour nozzles, which are used for both rocket take-off and landing.

BACKGROUND

Traditional nozzles on rocket engines have a single contour, which may have a bell contour or a conical contour. These traditional nozzles on rocket engines are shaped so that as gases flow therethrough, the gases are expanded to an area ratio (AR) that is lower than ambient pressure (i.e., the pressure at sea-level). Mechanisms are needed in rocket engines to optimize gas expansion in the nozzles at sea-level and at higher altitudes, so that the rocket engine can effectively be used for both rocket take-off and landing.

SUMMARY

Covered embodiments are defined by the claims, not this summary. This summary is a high-level overview of various aspects and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

Some embodiments of the present disclosure relate to a rocket engine including a primary chamber and a double contour nozzle attached to the primary chamber. In some embodiments, the double contour nozzle includes an inner contour nozzle including a conical contour and an outer contour nozzle including a bell contour and at least one propellant injection orifice. In some embodiments, the double contour nozzle includes a contour break point (e.g., a transition region) between the inner contour nozzle and the outer contour nozzle. In some embodiments, the transition region includes a radius of curvature of less than 0.75 and a tangency angle of 40 to 90 degrees.

In some embodiments, the radius of curvature of the transition region is less than 0.5.

In some embodiments, the tangency angle of the transition region is 40 to 80 degrees.

In some embodiments, the outer contour nozzle includes a plurality of propellant injection orifices.

In some embodiments, the outer contour nozzle also includes an outer contour nozzle exit and an axial length extending from the contour break point to the outer contour nozzle exit. In some embodiments, the at least one propellant injection orifice is positioned downstream of the contour break point from 0-15% along the axial length of the outer contour nozzle.

In some embodiments, the at least one propellant injection orifice is positioned downstream of the contour break point from 0-10% along the axial length of the outer contour nozzle.

In some embodiments, the primary chamber is configured to receive a liquid propellant, a solid propellant, a hybrid propellant, or any combination thereof.

In some embodiments, the at least one propellant injection orifice is configured to receive a liquid propellant, a solid propellant, a hybrid propellant, or any combination thereof.

Some embodiments of the present disclosure are directed to a rocket engine including a primary chamber and a includes contour nozzle attached to the primary chamber, wherein the double contour nozzle includes an inner contour nozzle including a conical contour and an outer contour nozzle including a bell contour, an outer contour nozzle exit, and at least one propellant injection orifice. In some embodiments, the double contour nozzle includes a contour break point between the inner contour nozzle and the outer contour nozzle. In some embodiments, the outer contour nozzle also includes an axial length extending from the contour break point to the outer contour nozzle exit, and the at least one propellant injection orifice is positioned downstream of the contour break point from 0-15% along the axial length of the outer contour nozzle.

In some embodiments, the transition region includes a radius of curvature of less than 0.75 and a tangency angle of 40 to 90 degrees.

In some embodiments, the outer contour nozzle also includes an augmenter.

In some embodiments, the augmenter is positioned within the outer contour nozzle downstream of the contour break point from 0-15% along the axial length of the outer contour nozzle.

In some embodiments, the augmenter is positioned within the outer contour nozzle downstream of the contour break-point from 0-10% along the axial length of the outer contour nozzle.

In some embodiments, a rocket engine includes a primary chamber and a double contour nozzle attached to the primary chamber, wherein the double contour nozzle includes an inner contour nozzle including a conical contour; an outer contour nozzle including a bell contour and at least one propellant injection orifice; and a transition region between the inner contour nozzle and the outer contour nozzle, wherein the transition region includes a radius of curvature that is less than 0.75 and a tangency angle that is in a range of from 40 degrees to 90 degrees.

In some embodiments, the radius of curvature is less than 0.5.

In some embodiments, the tangency angle is in a range of from 40 degrees to 80 degrees.

In some embodiments, the outer contour nozzle includes a plurality of propellant injection orifices.

In some embodiments, the outer contour nozzle also includes an outer contour nozzle downstream end and an axial length extending from the transition region to the outer contour nozzle downstream end, and the at least one propellant injection orifice is positioned downstream of the transition region from 0-15% along the axial length of the outer contour nozzle. In some embodiments, the at least one propellant injection orifice is positioned downstream of the transition region from 0-10% along the axial length of the outer contour nozzle.

In some embodiments, the primary chamber is configured to receive a liquid propellant, a solid propellant, a hybrid propellant, or any combination thereof.

In some embodiments, the at least one propellant injection orifice is configured to receive a liquid propellant, a solid propellant, a hybrid propellant, or any combination thereof.

In some embodiments, the at least one propellant injection orifice is configured to receive an oxidizer.

In some embodiments, a rocket engine includes a primary chamber and a double contour nozzle attached to the primary chamber, wherein the double contour nozzle includes an inner contour nozzle including a conical contour, and an outer contour nozzle including a bell contour, an outer contour nozzle downstream end, and at least one propellant injection orifice, and a transition region between the inner contour nozzle and the outer contour nozzle, wherein the outer contour nozzle also includes an axial length extending from the transition region to the outer contour nozzle downstream end, and wherein the at least one propellant injection orifice is positioned downstream of the transition region from 0-15% along the axial length of the outer contour nozzle.

In some embodiments, the outer contour nozzle includes a radius of curvature of less than 0.75 and a tangency angle of 40 to 90 degrees on a surface adjacent to the transition region.

In some embodiments, the outer contour nozzle includes a plurality of propellant injection orifices.

In some embodiments, the at least one propellant injection orifice is positioned within the outer contour nozzle downstream of the transition region from 0-10% along the axial length of the outer contour nozzle.

In some embodiments, the primary chamber is configured to receive a liquid propellant, a solid propellant, a hybrid propellant, or any combination thereof.

In some embodiments, the at least one propellant injection orifice is configured to receive a liquid propellant, a solid propellant, a hybrid propellant, or any combination thereof.

In some embodiments, a method of operating a rocket engine includes providing a rocket engine having a primary propulsion subsystem and a secondary propulsion subsystem; activating the primary propulsion subsystem; activating the secondary propulsion subsystem; performing a lift-off operation; deactivating the secondary propulsion subsystem; performing a mission operation; performing a landing operation; and deactivating the primary propulsion subsystem.

In some embodiments, the step of deactivating the secondary propulsion subsystem is a first deactivation of the secondary propulsion subsystem, and the method also includes reactivating the secondary propulsion subsystem, wherein the reactivating is performed after performing the mission operation and before performing the landing operation; and performing a second deactivation of the secondary propulsion subsystem, wherein the second deactivation of the propulsion subsystem is performed after performing the landing operation.

In some embodiments, the rocket engine includes a primary chamber; a double contour nozzle attached to the primary chamber, wherein the double contour nozzle includes an inner contour nozzle including a conical contour; an outer contour nozzle including a bell contour and at least one propellant injection orifice; and a transition region between the inner contour nozzle and the outer contour nozzle; wherein the transition region includes a radius of curvature of less than 0.75 and a tangency angle of 40 to 90 degrees.

In some embodiments, the step of activating the secondary propulsion subsystem includes initiating a flow of a propellant into the outer contour nozzle via the at least one propellant injection orifice to thereby initiate a secondary combustion in the outer contour nozzle. In some embodiments, the propellant includes an oxidizer.

DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

Figure 1A:
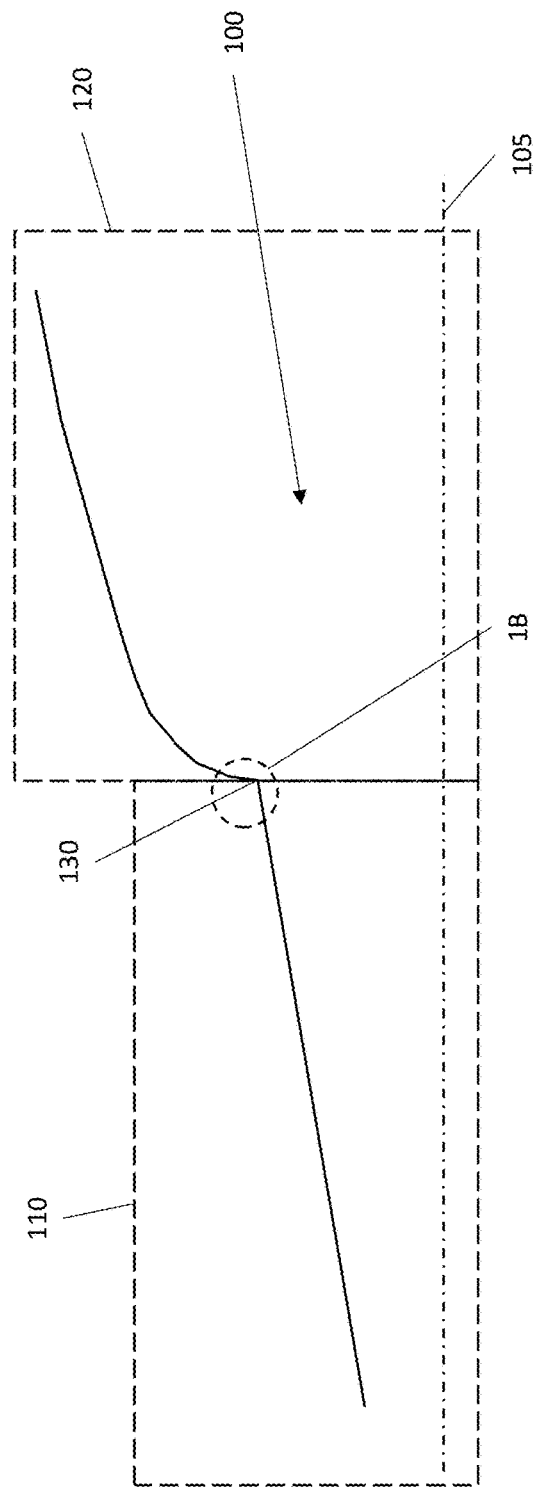
FIGS. 1A and 1B illustrate the definition of certain geometric terms that will be discussed herein.

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, terms such as "comprising" "including," and "having" do not limit the scope of a specific claim to the materials or steps recited by the claim.

As used herein, the term "consisting essentially of" limits the scope of a specific claim to the specified materials or steps and those that do not materially affect the basic and novel characteristic or characteristics of the specific claim.

As used herein, terms such as "consisting of" and "composed of" limit the scope of a specific claim to the materials and steps recited by the claim.

All prior patents, publications, and test methods referenced herein are incorporated by reference in their entireties.

As used herein, the term "conical contour" refers to a rocket engine nozzle with an axial length having a first end with a first radius and a second end with a second radius. In some embodiments, the second radius is greater than the first radius, and the radius of the nozzle expands at a constant rate from the first radius to the second radius. In some embodiments, the term "conical contour" further refers to a rocket nozzle where a cross-section of the rocket nozzle along the axial length has a conical shape.

As used herein, the term "bell contour" refers to a rocket engine nozzle with an axial length having a first end with a first radius and a second end with a second radius. In some embodiments, the second radius is greater than the first radius, and the radius of the nozzle does not expand at a constant rate from the first radius to the second radius. In some embodiments, the term "bell contour" refers to a rocket nozzle where a cross-section of the rocket nozzle along the axial length has a bell shape.

As used herein, the term "hybrid propellant" refers to a propellant that includes a solid propellant and at least one of a liquid propellant or a gas propellant.

Figure 1B:
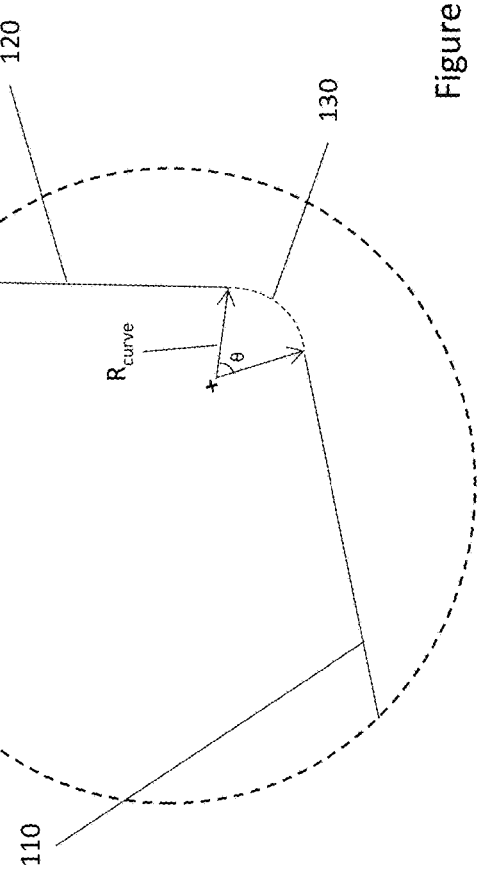

As used herein, the term "radius of curvature," as used to refer to the geometry of a curved region that connects two adjacent regions of a rocket nozzle, refers to the measured radius of the curved region as normalized by the throat radius of the rocket nozzle so as to represent the curvature non-dimensionally. For example, a curved region having a measured radius of 100 centimeters forms a portion of a rocket nozzle having a throat radius of 200 centimeters is characterized as having a radius of curvature of 100 cm/200 cm=0.5. FIGS. 1A and 1B show a broad view and magnified view, respectively, of a portion of a rocket nozzle 100 having a longitudinal centerline 105. The rocket nozzle 100 includes a first region 110, a second region 120, and a curved transition region 130 that connects the first region 110 to the second region 120. In FIG. 1B, the curved transition region 130 is shown in dashed lines to clearly delineate the curved transition region 130 from the first region 110 and the second region 120. Additionally, though the second region 120 is shown in FIG. 1A to have a curved shape, in FIG. 1B the second region 120 appears generally linear representing the linear inclination of a small portion of the second region 120 that is adjacent to the curved transition region 130. As shown in FIG. 1B, the curved transition region 130 includes an arc having a measured radius $R_{curve}$. The measured radius $R_{curve}$ is then normalized by the throat radius measured at an appropriate location in the rocket nozzle 100 to calculate the radius of curvature of the curved transition region 130 as described above and as used herein.

As used herein, the term "tangency angle" refers to the arc measure of a circular arc swept by a curved region that connects two adjacent regions of a rocket nozzle. For example, continuing to refer to FIGS. 1A and 1B, the tangency angle of the curved transition region 130 is denoted by the angle θ that is shown in FIG. 1B. Taken together, the radius of curvature and tangency angle provide characterization of a curve, with the radius of curvature characterizing how strongly turned a curve is (e.g., how "sharp" the curve is), and the tangency angle characterizing the distance over which the curve traverses with a curvature defined by the radius of curvature.

Some embodiments of the present disclosure are directed to a rocket engine. In some embodiments the rocket engine includes a primary chamber. In some embodiments, the primary chamber is a combustion chamber. In some embodiments, the primary chamber includes a first end and a second end. In some embodiments, the primary chamber includes an axial length with a first end and a second end. In some embodiments, the first end of the primary chamber corresponds to the first end of the primary chamber's axial length. In some embodiments, the second end of the primary chamber corresponds to the second end of the primary chamber's axial length.

In some embodiments, the primary chamber is configured to receive at least one propellant through its first end. In some embodiments, the at least one propellant includes a liquid propellant, a solid propellant, a hybrid propellant, or any combination thereof. In some embodiments, the primary chamber is configured to receive a plurality of propellants in some embodiments the plurality of propellants include the same type of propellant, i.e., a solid propellant, a liquid propellant, or a hybrid propellant. In some embodiments, the plurality of propellants are not the same type of propellant. For example, in some embodiments, the primary chamber is configured to receive, at the same or substantially the same time, a liquid propellant and a solid propellant, a liquid propellant and a hybrid propellant, a solid propellant and a hybrid propellant, or any combination thereof.

In some embodiments, the at least one propellant can be injected into the primary chamber using a pressure fed power cycle, an electric pump power cycle, a gas generator power cycle, a staged power cycle, a full flow staged power cycle, and expander power cycle, a combustion tap-off power cycle, or any combination thereof.

In some embodiments, the rocket engine includes a double contour nozzle. In some embodiments, the double contour nozzle is attached to the primary chamber. In some embodiments, the double contour nozzle includes a first end and a second end. In some embodiments, the double contour nozzle includes an axial length with a first end and a second end. In some embodiments, the first end of the double contour nozzle corresponds to the first end of the double contour nozzle's axial length. In some embodiments, the second end of the double contour nozzle corresponds to the second end of the double contour nozzle's axial length.

In some embodiments, the first end of the double contour nozzle is directly attached to the second end of the primary chamber. In some embodiments, the first end of the double contour nozzle is indirectly attached to the second end of the primary chamber. For example, in some embodiments, the rocket engine includes a throat. In some embodiments, the throat is between the second end of the primary chamber and the first end of the double contour nozzle.

In some embodiments, the double contour nozzle includes an inner contour nozzle. In some embodiments, the inner contour nozzle includes a first end and a second end. In some embodiments, the inner contour nozzle includes an axial length with a first end and a second end. In some embodiments, the first end of the inner contour nozzle corresponds to the first end of the inner contour nozzle's axial length. In some embodiments, the second end of the inner contour nozzle corresponds to the second end of the inner contour nozzle's axial length. In some embodiments, the first end of the inner contour nozzle corresponds to the first end of the double contour nozzle.

In some embodiments, the inner contour nozzle includes a conical contour. In some embodiments, the inner contour nozzle includes a conical contour along at least a portion of the inner contour nozzle's axial length. In some embodiments, the inner contour nozzle includes a conical contour along the entirety of the inner contour nozzle's axial length. In some embodiments, the inner contour nozzle includes a bell contour. In some embodiments, the inner contour nozzle includes a bell contour along at least a portion of the inner contour nozzle's axial length. In some embodiments, the inner contour nozzle includes a bell contour along the entirety of the inner contour nozzle's axial length.

In some embodiments, the double contour nozzle includes an outer contour nozzle. In some embodiment, the outer contour nozzle includes a first end and a second end. In some embodiments, the outer contour nozzle includes an axial length with a first end and a second end. In some embodiments, the first end of the outer contour nozzle corresponds to the first end of the outer contour nozzle's axial length. In some embodiments, the second end of the outer contour nozzle corresponds to the second end of the outer contour nozzle's axial length. In some embodiments, the second end of the outer contour nozzle corresponds to the second end of the double contour nozzle.

In some embodiments, the outer contour nozzle includes a bell contour. In some embodiments, the outer contour nozzle includes a bell contour along at least a portion of the outer contour nozzle's axial length. In some embodiments, the outer contour nozzle includes a bell contour along the entirety of the outer contour nozzle's axial length. In some embodiments, the outer contour nozzle includes a conical contour. In some embodiments, the outer contour nozzle includes a conical contour along at least a portion of the outer contour nozzle's axial length. In some embodiments, the outer contour nozzle includes a conical contour along the entirety of the outer contour nozzle's axial length.

In some embodiments, the double contour nozzle includes a transition region (e.g., a contour break point). In some embodiments, the transition region is between the inner contour nozzle and the outer contour nozzle. In some embodiments, the transition region is between the second end of the inner contour nozzle and the first end of the outer contour nozzle.

In some embodiments, the outer contour nozzle includes at least one propellant injection orifice. In some embodiments, the outer contour nozzle includes a plurality of propellant injection orifices. In some embodiments, the at least one propellant injection orifice is configured to receive a liquid propellant, a solid propellant, a hybrid propellant, or any combination thereof. In some embodiments, the plurality of injection orifices are configured to receive a liquid propellant, a solid propellant, a hybrid propellant, or any combination thereof.

In some embodiments, the propellant that is received by the propellant injection orifices includes an oxidizer. In some embodiments, the propellant that is received by the propellant injection orifices includes a combination of fuel and oxidizer. In some embodiments, the propellant received by the propellant injection orifices is injected into the interior of the outer contour nozzle. In some embodiments, injection of propellant that includes oxidizer (and, in some cases, fuel) into the exhaust of the primary chamber causes a secondary combustion with unreacted fuel that is within the exhaust. In some embodiments, the secondary combustion has the effect of producing additional axial thrust. In some embodiments, the secondary combustion has the effect of diverting the exhaust from the primary chamber away from the wall of the outer contour nozzle.

In some embodiments, the at least one propellant can be injected into the at least one propellant injection orifice using a pressure fed power cycle, an electric pump power cycle, a gas generator power cycle, a staged power cycle, a full flow staged power cycle, and expander power cycle, a combustion tap-off power cycle, or any combination thereof.

In some embodiments, the at least one propellant injection orifice is positioned downstream of the transition region from 0-15% along the axial length of the outer contour nozzle. In some embodiments, the at least one propellant injection orifice is positioned downstream of the transition region from 0 to 10% along the axial length of the outer contour nozzle, from 0 to 5% along the axial length of the outer contour nozzle, from 0 to 3% along the axial length of the outer contour nozzle, or from 0 to 1% along the axial length of the outer contour nozzle. In some embodiments, the at least one propellant injection orifice is positioned downstream of the transition region from 5 to 15% along the axial length of the outer contour nozzle, from 10 to 15% along the axial length of the outer contour nozzle, or from 5 to 10% along the axial length of the outer contour nozzle. In some embodiments, positioning of the propellant injection orifices relatively close to the transition region (e.g., as defined above) provides a combustion location that is relatively close to the inner contour nozzle, thereby facilitating the secondary combustion that is induced by the injection of propellant through the propellant injection orifices.

In some embodiments the outer contour nozzle has a radius of curvature of less than 1 on a surface adjacent to the contour break point. In some embodiments, outer contour nozzle has a radius of curvature of less than 0.75 on a surface adjacent to the contour break point. In some embodiments, the outer contour nozzle has a radius of curvature of less than 0.5 on a surface adjacent to the contour break point. In some embodiments, the outer contour nozzle has a radius of curvature of less than 0.25 on a surface adjacent to the contour break point. In some embodiments, the outer contour nozzle has a radius of curvature of less than 0.1 on a surface adjacent to the contour break point.

In some embodiments, the transition region between the inner contour nozzle and the outer contour nozzle has a radius of curvature of less than 1. In some embodiments, the transition region between the inner contour nozzle and the outer contour nozzle has a radius of curvature of less than 0.75. In some embodiments, the transition region between the inner contour nozzle and the outer contour nozzle has a radius of curvature of less than 0.5. In some embodiments, the transition region between the inner contour nozzle and the outer contour nozzle has a radius of curvature of less than 0.25. In some embodiments, the transition region between the inner contour nozzle and the outer contour nozzle has a radius of curvature of less than 0.11.

In some embodiments, the outer contour nozzle has a tangency angle from 40 to 90 degrees on a surface adjacent to the contour break point. In some embodiments, the outer contour nozzle has a tangency angle from 45 to 90 degrees, from 50 to 90 degrees, from 55 to 90 degrees, from 60 to 90 degrees, from 65 to 90 degrees, from 70 to 90 degrees, from 75 to 90 degrees, from 80 to 90 degrees, from 85 to 90 degrees, from 40 to 85 degrees, from 40 to 80 degrees, from 40 to 75 degrees, from 40 to 70 degrees, from 40 to 65 degrees, from 40 to 60 degrees, from 40 to 55 degrees, from 40 to 50 degrees, from 40 to 45 degrees, from 45 to 85 degrees, from 50 to 80 degrees, from 55 to 75 degrees, or from 60 to 70 degrees on a surface adjacent to the contour break point.

In some embodiments, the transition region between the inner contour nozzle and the outer contour nozzle has a tangency angle of from 40 to 90 degrees, from 45 to 90 degrees, from 50 to 90 degrees, from 55 to 90 degrees, from 60 to 90 degrees, from 65 to 90 degrees, from 70 to 90 degrees, from 75 to 90 degrees, from 80 to 90 degrees, from 85 to 90 degrees, from 40 to 85 degrees, from 40 to 80 degrees, from 40 to 75 degrees, from 40 to 70 degrees, from 40 to 65 degrees, from 40 to 60 degrees, from 40 to 55 degrees, from 40 to 50 degrees, from 40 to 45 degrees, from 45 to 85 degrees, from 50 to 80 degrees, from 55 to 75 degrees, or from 60 to 70 degrees.

In some embodiments, the sharp discontinuity between the inner and outer contours ("sharp discontinuity" being defined based on radius of curvature and tangency angle as described herein) has the effect of producing "lee surfaces" past the transition region that help to stabilize the secondary combustion.

In some embodiments, the rocket engine includes an augmenter. In some embodiments, the augmenter is positioned within the outer contour nozzle downstream of the transition region (e.g., contour break point) from 0-15% along the axial length of the outer contour nozzle. In some embodiments, the augmenter is positioned downstream of the transition region from 0 to 10% along the axial length of the outer contour nozzle, from 0 to 5% along the axial length of the outer contour nozzle, from 0 to 3% along the axial length of the outer contour nozzle, or from 0 to 1% along the axial length of the outer contour nozzle. In some embodiments, the augmenter is positioned downstream of the transition region from 5 to 15% along the axial length of the outer contour nozzle, from 10 to 15% along the axial length of the outer contour nozzle, or from 5 to 10% along the axial length of the outer contour nozzle.

In some embodiments, the augmenter includes a plurality of propellant injection orifices. In some embodiments, at least one of the plurality of propellant injection orifices in the augmenter is configured to receive a liquid propellant, a solid propellant, a hybrid propellant, or any combination thereof. In some embodiments, at least one of the plurality of propellant injection orifices in the augmenter is configured to receive an oxidizer. In some embodiments, the plurality of injection orifices in the augmenter are in the same axial plane. In some embodiments, a first one of the plurality of injection orifices in the augmenter is in a different axial plant from at second one of the plurality of injection orifices in the augmenter. In some embodiments, the plurality of injection orifices in the augmenter are in concentric rings.

In some embodiments, the inner contour nozzle includes an expansion ratio. In some embodiments, the expansion ratio is selected to work with the augmenter to provide thrust augmentation during lift-off of the rocket engine. In some embodiments, the expansion ratio of the inner contour nozzle is selected to provide highly under-expanded flow during lift-off of the rocket engine and over-expanded flow during landing of the rocket engine. In some embodiments, the expansion ratio of the inner contour nozzle is selected to maximize flow stability of the exhaust gases at reduced ambient pressure, and also to support pressure matching conditions during lift-off thrust augmentation operation.

In some embodiments, the inner contour nozzle includes a first area ratio ("AR"). In some embodiments, the first AR is the cross-sectional area of the inner contour nozzle at the first end of the inner contour nozzle. In some embodiments, the inner contour nozzle includes a second AR. In some embodiments, the second AR is the cross-sectional area of the inner contour nozzle at the second end of the inner contour nozzle. In some embodiments, the expansion ratio of the inner contour nozzle is the ratio of the second AR to the first AR.

The present disclosure will now be described with reference to non-limiting exemplary embodiments depicted in FIGS. 2-4.

Figure 2:
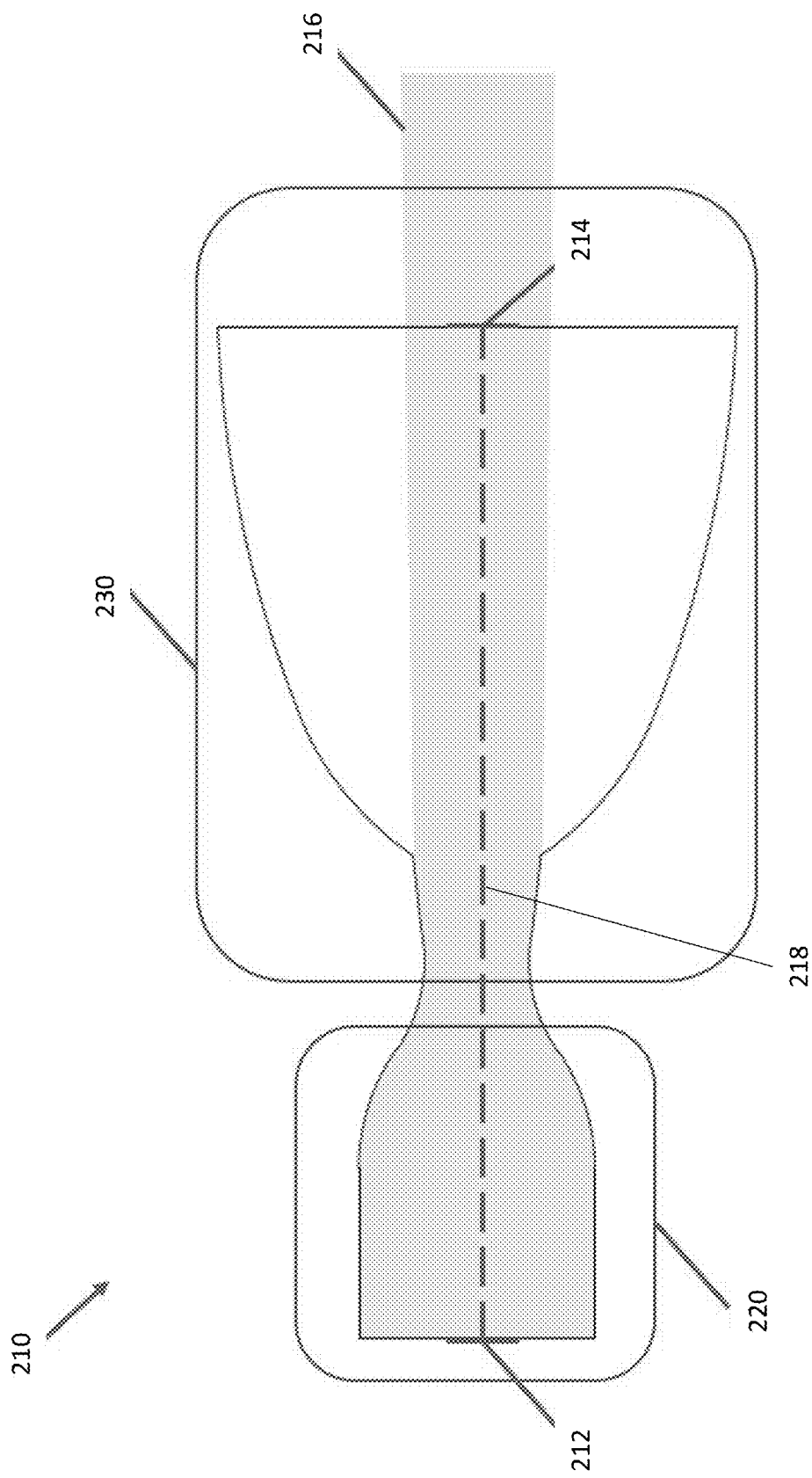
FIG. 2 is a cross-sectional view of a rocket engine according to an embodiment of the present disclosure.

FIG. 2 depicts a cross-section of rocket engine 10 according to an embodiment of the present disclosure. As shown in FIG. 2, the rocket engine 210 includes a primary chamber 220 and a double contour nozzle 230. In some embodiments, as shown in FIG. 2, the primary chamber 20 is attached to the double contour nozzle 30. In addition, as shown in FIG. 2, the primary chamber is configured to receive "primary fuel." In some embodiments, the primary fuel includes at least one propellant. In some embodiments, the at least one propellant includes a liquid propellant, a solid propellant, a hybrid propellant, or any combination thereof. In some embodiments, combustion of the primary fuel in the primary chamber 220 results in the flow of a gas stream 216 from the primary chamber 220 and through the double contour nozzle 230. In some embodiments, as shown in FIG. 2, the rocket engine 210 has a first end 212 at a first end, a second end 214, and an axial length 218 (indicated by a dashed line extending from the first end 212 to the second end 214).

Figure 3:
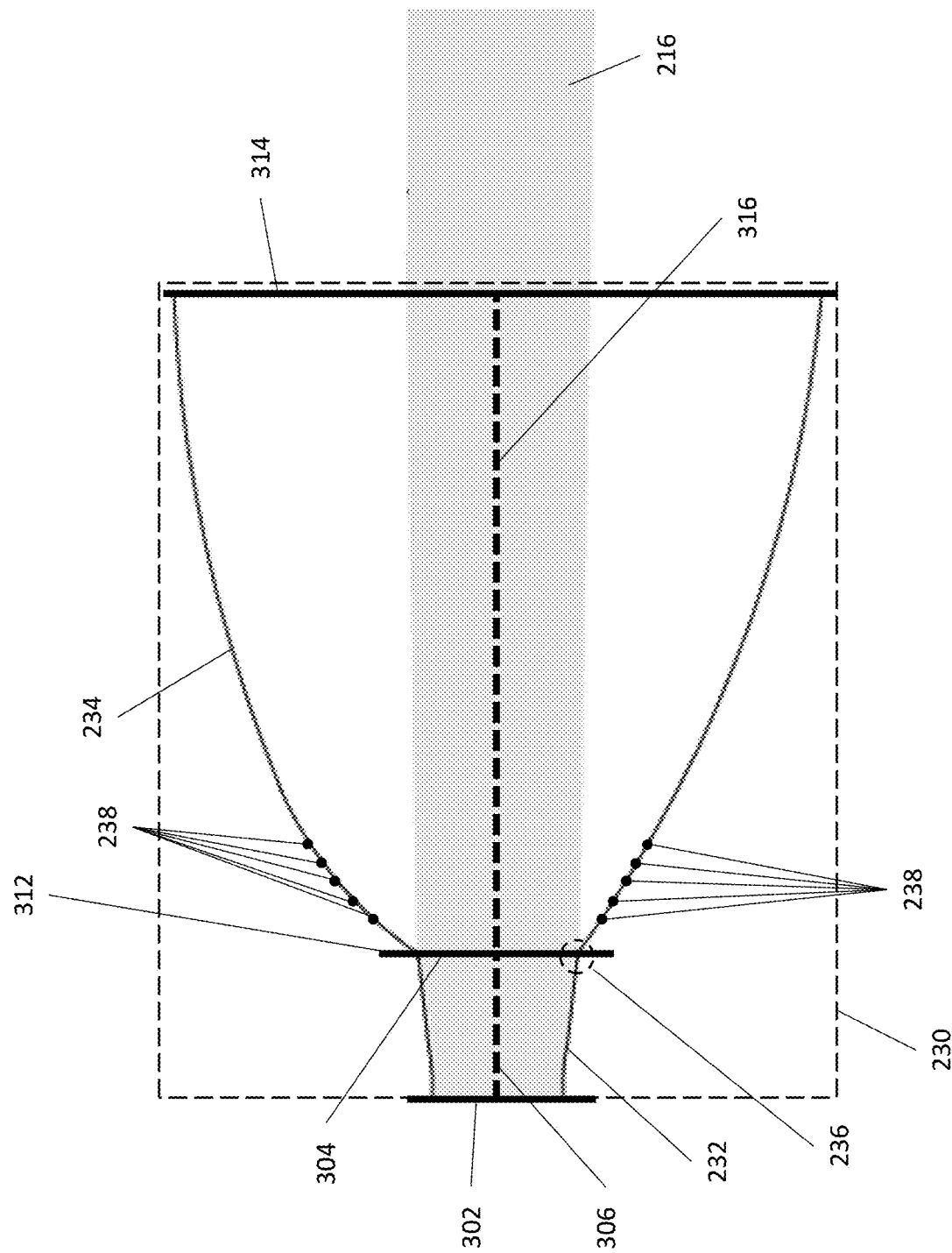
FIG. 3 is a cross-sectional view of dual contour nozzle of the rocket engine one FIG. 2 according to an embodiment of the present disclosure.
Figure 4:
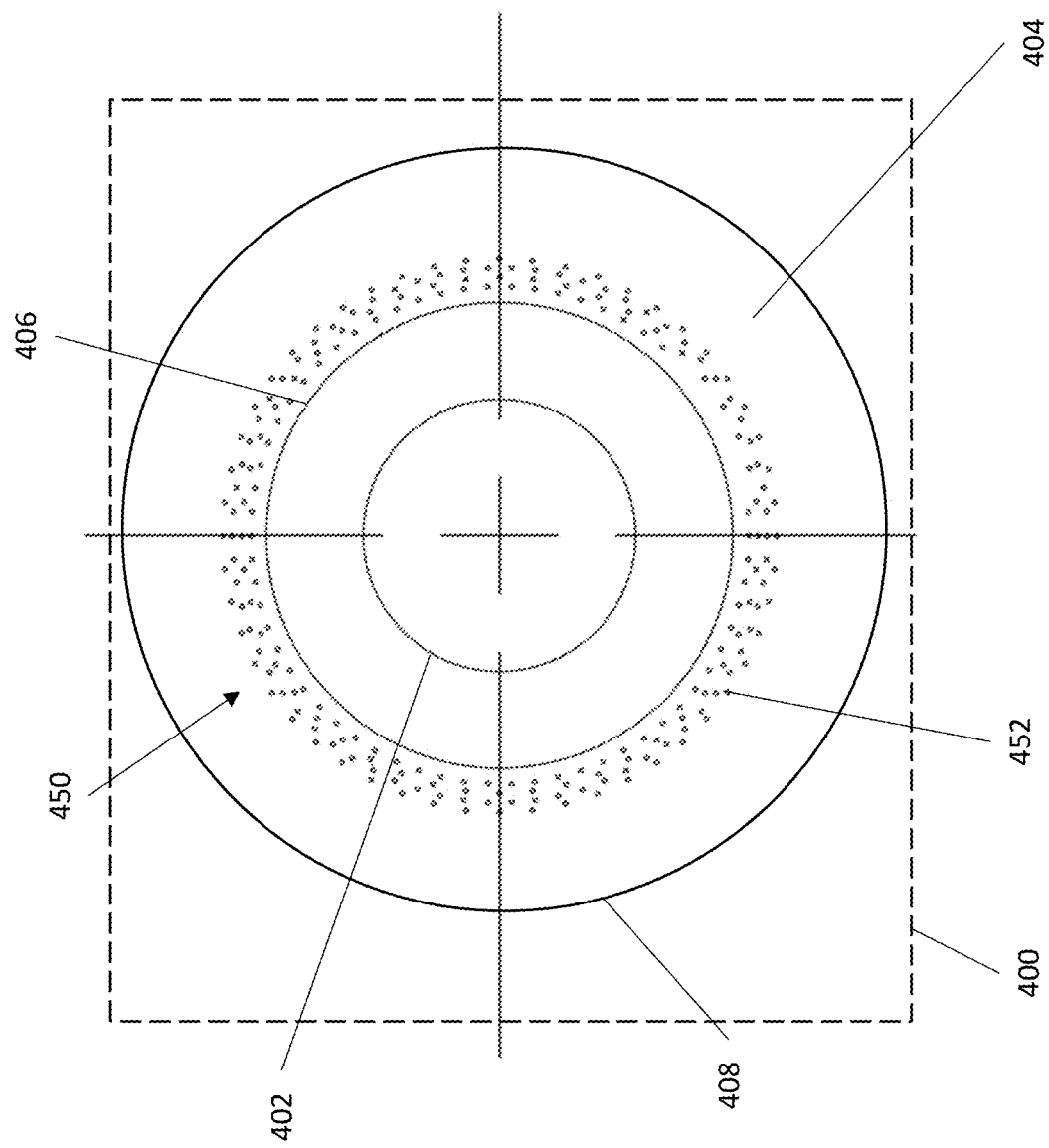
FIG. 4 depicts an augmenter according on embodiment of the present invention.

FIG. 3 depicts a cross-section of the double contour nozzle 230 shown in FIG. 2. As shown in FIG. 3, in some embodiments, the double contour nozzle 230 includes an inner contour nozzle 232 having a conical contour and an outer contour nozzle 234 having a bell contour. As shown in FIG. 3, in some embodiments, the inner contour nozzle 232 has a first end 302, a second end 304, and an axial length 306 (indicated by a dashed line extending from the first end 302 to the second end 304). In some embodiments, as shown in FIG. 3, the outer contour nozzle 234 has a first end 312 (coincident with the second end 304 of the inner contour nozzle 232), a second end 314 (e.g., a downstream end), and an axial length 316 (indicated by a dashed line extending from the first end 312 to the second end 314).

As shown in FIG. 3, in some embodiments, the double contour nozzle includes a transition region 236 between the inner contour nozzle 232 and the outer contour nozzle 234. In some embodiments, as shown in FIG. 3, the outer contour nozzle 234 is downstream of the transition region 236. In some embodiments, the transition region 236 is a curved region having a radius of curvature that is less than 0.75. In some embodiments, the transition region 236 has a tangency angle that is in a range of from 40 degrees to 90 degrees.

Continuing to refer to FIG. 3, in some embodiments, the outer contour nozzle includes a plurality of propellant injection orifices 238. In some embodiments, the plurality of propellant injection orifices 238 are configured to receive at least one of a solid propellant, a liquid propellant, a hybrid propellant, or any combination thereof. As shown in FIG. 3, in some embodiments, the at least one propellant injection orifice 238 is positioned downstream of the transition region 236. In some embodiments, the at least one propellant injection orifice is positioned downstream of the transition region 236 from 0-15% along the axial length 316 of the outer contour nozzle 234. In some embodiments, the at least one propellant injection orifice is positioned downstream of the transition region 236 from 0-10% along the axial length 316 of the outer contour nozzle 234. In some embodiments, the at least one propellant injection orifice is positioned downstream of the transition region 236 from 5-15% along the axial length 316 of the outer contour nozzle 234. In some embodiments, the at least one propellant injection orifice is positioned downstream of the transition region 236 from 0-20% along the axial length 316 of the outer contour nozzle 234. In some embodiments, the at least one propellant injection orifice is positioned downstream of the transition region 236 from 5-20% along the axial length 316 of the outer contour nozzle 234. In some embodiments, the at least one propellant injection orifice is positioned downstream of the transition region 236 from 10-20% along the axial length 316 of the outer contour nozzle 234.

In some embodiments, an exemplary rocket nozzle includes an augmenter. FIG. 4 depicts a rocket nozzle 400 including augmenter 450 according to an embodiment of the present disclosure. In FIG. 4, the rocket nozzle 400 is viewed along the thrust axis of the rocket nozzle (e.g., along the direction of flow of the gas stream 216 shown in FIG. 2). The rocket nozzle 400 includes a throat 402 (e.g., a narrowest region of the rocket nozzle 400, at which the throat radius is measured), a double contour nozzle 404 having a transition region 406, and a downstream end 408 (e.g., analogous to the second end 314 of the outer contour nozzle 234 described above). As shown in FIG. 4, in some embodiments, the augmenter 450 includes a plurality of propellant injection orifices 452 (only one of which is specifically called out by the reference numeral 452 in FIG. 4 for clarity of illustration). In some embodiments, the propellant injection orifices 452 are positioned in concentric circles. As shown in FIG. 4, in some embodiments, the augmenter 450 is positioned downstream of the transition region 406 in the outer contour nozzle 404.

In some embodiments, an exemplary rocket engine 10 having a dual contour nozzle as described in the present disclosure is operated as follows. In some embodiments, the rocket engine 10 can be described to include a primary propellant subsystem, which may include, for example, the primary chamber 20 described above, and operation of which may include combustion of propellant within the primary chamber 20. In some embodiments, the rocket engine 10 can be described to include a secondary propellant subsystem, which may include, for example, the outer contour nozzle 34, and operation of which may include combustion of propellant within the outer contour nozzle 34 caused by injection of propellant into the exhaust stream of the primary propellant subsystem via the propellant injection orifices 38. In some embodiments, the exemplary rocket engine 10 may be operable in a lift-off phase, a main phase, and a landing phase.

In some embodiments, the primary propellant subsystem is operated during all phases of engine operation. In some embodiments, the secondary propellant subsystem is operated only during the lift-off phase. In some embodiments, the secondary propellant subsystem is operated during the lift-off phase and during the landing phase. In some embodiments, the secondary propellant system is operated during operational phases that require additional thrust, e.g., lift-off and/or landing.

Figure 5:
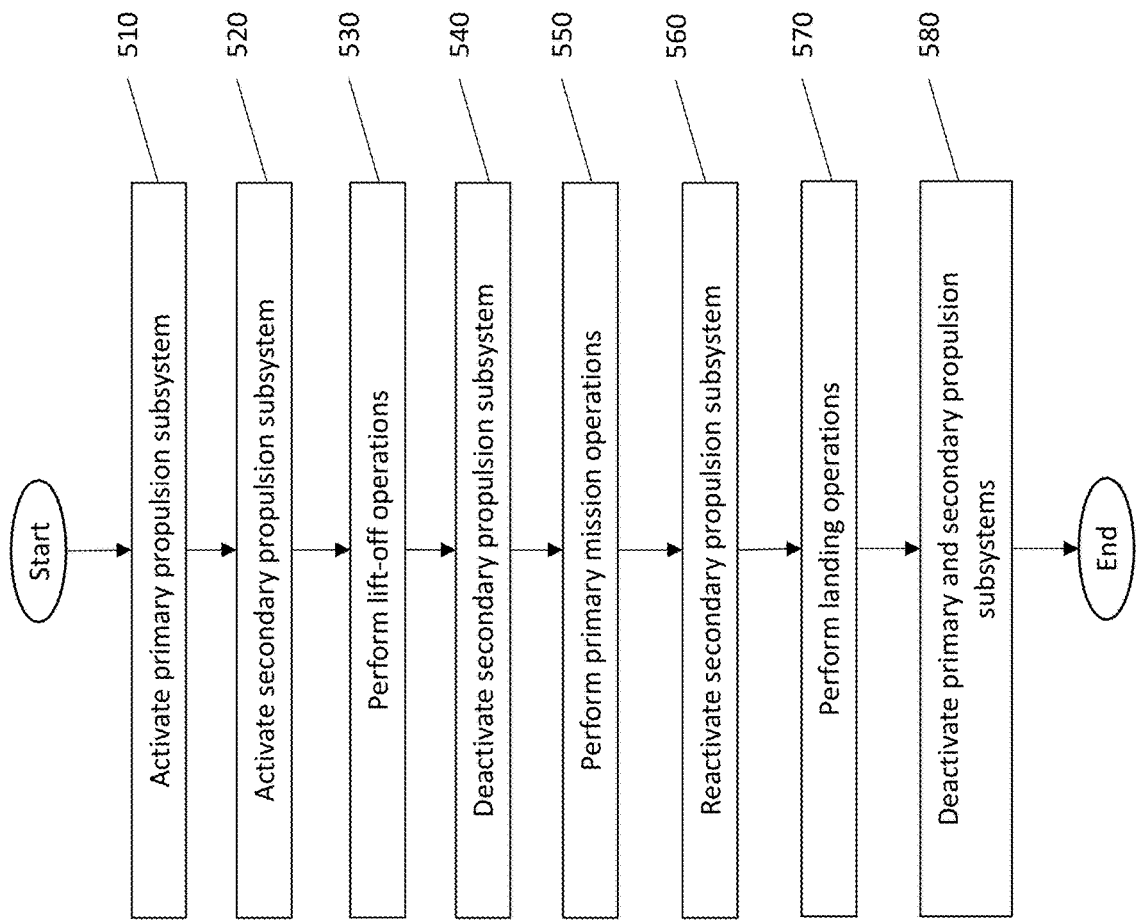
FIG. 5 is a flowchart of an exemplary method for operation of a rocket including a rocket engine according to an embodiment of the present disclosure.

In some embodiments, a rocket including the rocket engine 10 is operated in accordance with the method 500 shown in flowchart form in FIG. 5 and described herein. In step 510, the primary propulsion subsystem is activated. In some embodiments, activation of the primary propulsion subsystem includes beginning to provide propellant to the primary chamber and initiating combustion within the primary chamber. In step 520, the secondary propulsion subsystem is activated. In some embodiments, activation of the secondary propulsion subsystem includes beginning to provide propellant within the outer contour nozzle 34 via the propellant injection orifices 38. In some embodiments, secondary combustion occurs within the outer contour nozzle 34 as a result due to the presence of heated exhaust gases and unspent fuel within the exhaust of the primary combustion subsystem.

Following activation of the primary and secondary combustion subsystems, in step 530 lift-off operations are performed. In various embodiments, the specific nature of the lift-off operations will depend on the other characteristics of the rocket engine 10, the planned mission of the rocket including the rocket engine 10, etc. After lift-off operations have been completed, in step 540, the secondary propulsion system is deactivated. In some embodiments, deactivation of the secondary propulsion subsystem includes ceasing to provide propellant within the outer contour nozzle 34 via the propellant injection orifices 38. In some embodiments, due to the lack of additional propellant within the outer contour nozzle 34, secondary combustion ceases.

Following step 540, in step 550, the primary mission of the rocket is performed with the primary propulsion subsystem active and the secondary propulsion subsystem inactive. In some embodiments, the specific events that occur during step 550 will depend on the other characteristics of the rocket that includes the rocket engine 10, the planned mission of the rocket, etc.

In some embodiments, in step 560, the secondary propulsion system is reactivated. In some embodiments, reactivation of the secondary propulsion subsystem in step 560 involves substantially the same actions as initial activation of the secondary propulsion subsystem in step 520 described above. In some embodiments, following step 560, in step 570 landing operations are performed. Similar to the lift-off operations and the primary mission operations described above, in some embodiments, the nature of the landing operations performed in step 570 will depend on the nature of the rocket that includes the rocket engine 10, the mission of the rocket, etc. In some embodiments, following landing operations, in step 580 the primary and secondary propulsion subsystems are deactivated. Following step 580, the method 500 is complete.

In some embodiments, the secondary propulsion system is utilized only during lift-off operations, and is not utilized during landing operations as discussed above with reference to steps 560 and 570. In such embodiments, the method 500 omits step 560, and the deactivation of step 580 following landing operations includes only deactivation of the primary propulsion subsystem.

Variations, modifications and alterations to embodiments of the present disclosure described above will make themselves apparent to those skilled in the art. All such variations, modifications, alterations and the like are intended to fall within the spirit and scope of the present disclosure, limited solely by the appended claims.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

The disclosure described herein may be practiced in the absence of any element or elements, limitation or limitations, which is not specifically disclosed herein. Thus, for example, in each instance herein, any of the terms "comprising," "consisting essentially of and "consisting of" may be replaced with either of the other two terms, without altering their respective meanings as defined herein. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

What is claimed:

1. A method of operating a rocket engine, comprising:
providing a rocket engine, wherein the rocket engine comprises:
  a primary propulsion subsystem,
  a secondary propulsion subsystem,
  a primary chamber,
  a double contour nozzle attached to the primary chamber, wherein the double contour nozzle comprises:
    an inner contour nozzle comprising a conical contour;
    an outer contour nozzle comprising
      a bell contour, and
      at least one propellant injection orifice, and
    a transition region between the inner contour nozzle and the outer contour nozzle,
      wherein the transition region comprises a radius of curvature of less than 0.75 and a tangency angle of 40 to 90 degrees;
activating the primary propulsion subsystem;
activating the secondary propulsion subsystem;
performing a lift-off operation;
deactivating the secondary propulsion subsystem;
performing a mission operation;
performing a landing operation; and
deactivating the primary propulsion subsystem.

2. The method of claim 1,
wherein the step of deactivating the secondary propulsion subsystem is a first deactivation of the secondary propulsion subsystem, and
wherein the method further comprises:
  reactivating the secondary propulsion subsystem, wherein the reactivating is performed after performing the mission operation and before performing the landing operation; and
  performing a second deactivation of the secondary propulsion subsystem, wherein the second deactivation of the propulsion subsystem is performed after performing the landing operation.

3. The method of claim 1, wherein the step of activating the secondary propulsion subsystem comprises initiating a flow of a propellant into the outer contour nozzle via the at least one propellant injection orifice to thereby initiate a secondary combustion in the outer contour nozzle.

4. The method of claim 3, wherein the propellant comprises an oxidizer.

5. The method of claim 3, wherein the step of deactivating the secondary propulsion system comprises ceasing the flow of the propellant into the outer contour nozzle via the at least one propellant injection orifice.

6. The method of claim 3, wherein the propellant comprises a liquid propellant, a solid propellant, a hybrid propellant, or any combination thereof.

7. The method of claim 1, wherein the at least one propellant injection orifice is positioned within the outer contour nozzle downstream of the transition region from 0-10% along the axial length of the outer contour nozzle.

8. The method of claim 1, wherein the at least one propellant injection orifice comprises a plurality of propellant injection orifices.

9. The method of claim 1, wherein the radius of curvature is less than 0.5.

10. The method of claim 1, wherein the tangency angle is in a range of from 40 degrees to 80 degrees.

* * * * *